US012747147B2

(12) United States Patent
Lehmann

(10) Patent No.: US 12,747,147 B2
(45) Date of Patent: Sep. 29, 2026

(54) HANDLING MACHINE COMPRISING A MANUALLY OPERABLE CONTROL DEVICE

(71) Applicant: MANITOU BF, Ancenis (FR)

(72) Inventor: Thierry Lehmann, Ancenis (FR)

(73) Assignee: MANITOU BF, Ancenis (FR)

(*) Notice: Subject to any disclaimer, the term of this patent is extended or adjusted under 35 U.S.C. 154(b) by 0 days.

(21) Appl. No.: 18/841,148

(22) PCT Filed: Mar. 15, 2023

(86) PCT No.: PCT/FR2023/050348
§ 371 (c)(1),
(2) Date: Aug. 23, 2024

(87) PCT Pub. No.: WO2023/175273
PCT Pub. Date: Sep. 21, 2023

(65) Prior Publication Data

US 2025/0162849 A1 May 22, 2025

(30) Foreign Application Priority Data

Mar. 17, 2022 (FR) ........................................ 2202370

(51) Int. Cl.
*B66F 9/20* (2006.01)
*B66F 9/065* (2006.01)
*B66F 9/075* (2006.01)

(52) U.S. Cl.
CPC .............. *B66F 9/20* (2013.01); *B66F 9/0655* (2013.01); *B66F 9/0759* (2013.01); *B66F 9/0755* (2013.01)

(58) Field of Classification Search
CPC ........ B66F 9/20; B66F 9/0655; B66F 9/0759; B66F 9/0755; G05G 2009/04774; E02F 3/286; E02F 9/2004
See application file for complete search history.

(56) References Cited

U.S. PATENT DOCUMENTS 6,226,582 B1 * 5/2001 Adsett ........................ B66F 9/20 180/68.5
6,374,147 B1 * 4/2002 Rockwood .............. E02F 3/432 700/71

(Continued)

FOREIGN PATENT DOCUMENTS

CN 205225907 U * 5/2016 ............ E02F 9/2004
EP 1015378 B1 4/2002

(Continued)

OTHER PUBLICATIONS

International Search Report and Written Opinion for International Patent Application No. PCT/FR2023/050348, mailed Jun. 29, 2023, 12 pages.

*Primary Examiner* — Rachid Bendidi
*Assistant Examiner* — Joseph Anderson Yanoska
(74) *Attorney, Agent, or Firm* — Husch Blackwell LLP

(57) ABSTRACT

A handling machine is disclosed that includes a telescopic lifting arm and a handling device pivotable between an emptying position and a digging position; a processing unit and a control device including a control body manually operable to generate a control signal for pivoting the arm by pivoting the control body about a first axis. A control member operable using a thumb of an operator is located on one side of the control body and is mounted so as to pivot or slide about or along a second pivot or slide axis to generate a control signal for controlling the sliding of the second segment of the arm. The control member is also movably mounted so as to pivot or slide about or along a third pivot or slide axis to control the pivoting of the handling device.

17 Claims, 9 Drawing Sheets

(56) References Cited

U.S. PATENT DOCUMENTS

| | | | | |
|---|---|---|---|---|
| 10,718,098 | B1 | 7/2020 | Hager et al. | |
| 2012/0152575 | A1* | 6/2012 | Hand | F15B 13/043 701/50 |
| 2022/0195697 | A1* | 6/2022 | Fredrickson | E02F 9/2004 |

FOREIGN PATENT DOCUMENTS

| | | | |
|---|---|---|---|
| FR | 2858861 | B1 | 6/2007 |
| WO | 2020245531 | A1 | 12/2020 |

* cited by examiner

HANDLING MACHINE COMPRISING A MANUALLY OPERABLE CONTROL DEVICE

TECHNICAL FIELD

The present disclosure generally relates to handling machines.

BACKGROUND

The prior art discloses handling machines which comprise, at the end of a lifting arm, a handling device, such as a fork device, which can be pivoted in relation to the lifting arm about a substantially horizontal axis, in one direction for a pick-up operation and in the opposite direction for a discharge operation.

The handling device can also be lifted or lowered by pivoting the lifting arm, about a substantially horizontal axis, in relation to the chassis of the handling machine.

When the lifting arm is of the telescopic type, the handling device can also be shifted by controlling the telescopic mobility of the arm.

Usually, the mobility of the lifting arm and the mobility of the handling device can be controlled using a joystick which comprises a manually graspable control body and a fixed base, in relation to which the control body can be moved in multiple ways.

The control body of the joystick has a first mobility about a substantially horizontal axis transverse to the longitudinal axis of the machine to make it possible to pivot the body of the joystick forward or backward from a neutral position, such that pivoting the body of the joystick backward controls the lifting of the lifting arm and pivoting the joystick body forward controls the lowering of the lifting arm.

The body of the joystick has a second mobility about a substantially horizontal axis parallel to the longitudinal axis of the machine to make it possible to pivot the body of the joystick laterally to one side or the other from a neutral position, which is to say to the left or to the right of the machine with reference to the operator present in the cabin. Pivoting the joystick to a lateral side of the machine controls the pivoting of the handling device in the pick-up position and pivoting the joystick to the opposite lateral side controls the pivoting of the handling device in the discharge position.

The control body of the joystick may comprise a rotary selector that the operator can turn with one finger in one direction or the other to control the telescopic mobility of the arm in the sense of retracting or extending the arm.

However, numerous errors in handling the joystick for the pick-up and discharge operations are observed. Possible consequences of an erroneous movement are a load falling out due to the inclination of the fork device, or the loss of materials filling a bucket, for example. This presents a safety risk and a risk of losing the load which is being handled.

The operator must often test the pivoting of the control body of the joystick by exerting a small movement in order to visually observe the movement of the handling device, and possibly correct it by making the reverse movement.

The application WO2020245531 A1 describes a load handling machine which comprises a wheeled chassis, a drive system for moving the wheeled chassis, a load handling system carried by the chassis, a control unit, and a device for controlling the load handling system that can be manually actuated by an operator.

The aim of the present disclosure is to provide a new handling machine that makes it possible to overcome all or some of the problems set out above.

SUMMARY

To that end, a subject of the disclosure is a handling machine comprising:

- a chassis;
- a telescopic lifting arm carried by the chassis, the lifting arm comprising two arm segments which can be shifted slidingly in relation to one another, the lifting arm being mounted pivotably in relation to the chassis between a low position and a high position;
- a handling device, such as a bucket or a system of forks, which is mounted at one end of the lifting arm, the handling device being able to pivot in relation to the lifting arm between a lowered position, referred to as discharge position, and a raised position, referred to as pick-up position;
- a processing unit for controlling the pivoting of the lifting arm, the sliding of the second segment of the lifting arm, and the pivoting of the handling device; and
- a control device comprising:
- a control body, such as the body of a joystick, which can be operated with an operator's hand to generate a control signal for pivoting the lifting arm, by pivoting the control body toward the front or toward the rear of the machine about a first pivot axis, and
- a control member, which can be operated with the thumb of the operator's hand, such as a rotary selector or a slider, said control member being carried by the control body, on one side of the control body, and mounted pivotably or slidingly in relation to the control body about or along a second pivot or sliding axis, to generate a control signal for sliding the second segment of the lifting arm,
- characterized in that the control member is also mounted pivotably or slidingly in relation to the control body about or along a third pivot or sliding axis, transverse to the second pivot or sliding axis, to control the pivoting of the handling device in relation to the lifting arm between the discharge position and the pick-up position.

The new design of the control device, which is preferably in the form of a joystick (control lever), allows the operator to control the pivoting of the handling device for the pick-up or discharge, by operating the control member, such as a rotary selector or a slider, situated on a lateral side of the mobile body of the control device, by shifting the thumb upward (and forward) for the pick-up or downward (and rearward) for the discharge.

As explained above, in the prior art, pivoting the handling device for the pick-up or the discharge requires making the mobile body of the control device pivot laterally, which is to say about an axis substantially parallel to the longitudinal axis of forward travel of the machine, and this is not intuitive and requires there to be enough lateral space around the control device to not collide with anything.

By virtue of the machine according to the disclosure, by simply shifting their thumb substantially upward, while remaining positioned on the lateral control member to shift the lateral control member in relation to the mobile body of the control device carrying it, the operator can intuitively control the pick-up.

Similarly, by simply lowering the thumb to shift the lateral control member in relation to the mobile body of the control device carrying it, the operator can intuitively control the discharge. The operator does not need to laterally rock the mobile body of the control device, by contrast to the prior art, to obtain the pick-up and discharge function, and this avoids handling errors (since the movement to the right or left does not intuitively manifest in the pick-up, or the discharge, which are rotational movements of the handling device in a vertical plane) and moreover avoids being hindered or restrained by lateral obstructions around the joystick.

It should be noted that such a design of the control device makes it possible to keep a possible combination of the various mobilities, such as a combined movement of a raising of the arm and a pick-up operation of the handling device.

Positioning the control member, such as a rotary selector or a slider, laterally, which is to say on a lateral side of the control device, so as to be accessible by the thumb allows the operator to precisely control the pickup and discharge movement. This is because the thumb is a precise digit which is resistant to force. The operator does not need to move the wrist sideways to control the pickup and discharge, and this limits the risks of musculoskeletal disorders (crossover of the ligaments).

It is thus possible to design the control device such that its body does not have any lateral rocking mobility, and this makes it possible to limit the width of the cab.

The handling machine may also have one or more of the following features in any technically admissible combination.

According to one embodiment of the disclosure, the control body of the control device comprises a single pivot axis which is formed by the first pivot axis.

According to one embodiment of the disclosure, the control body of the control device does not have any lateral pivoting mobility.

According to one embodiment of the disclosure, in the non-operated state of the main body of the control device, the third pivot or sliding axis of the control member has, with reference to a shift along said third axis from a point situated toward the rear of the machine to a point situated toward the front of the machine, a downwardly oriented inclination in relation to the horizontal.

According to one embodiment of the disclosure, in the non-operated state of the main body of the control device, the second pivot or sliding axis of the control member has, with reference to a shift along said second axis from a point toward the rear of the machine to a point toward the front of the machine, an upwardly oriented inclination in relation to the horizontal.

According to one embodiment, the control member is situated on a lateral side of the body of the joystick corresponding to an area where the thumb of the operator's hand is positioned.

According to one embodiment of the disclosure, the second pivot or sliding axis and the third pivot or sliding axis are orthogonal.

BRIEF DESCRIPTION OF THE DRAWINGS

Further features and advantages of the disclosure will become more apparent from the following description, which is purely illustrative and nonlimiting and should be read in conjunction with the appended drawings, in which.

DETAILED DESCRIPTION

Figure 1:
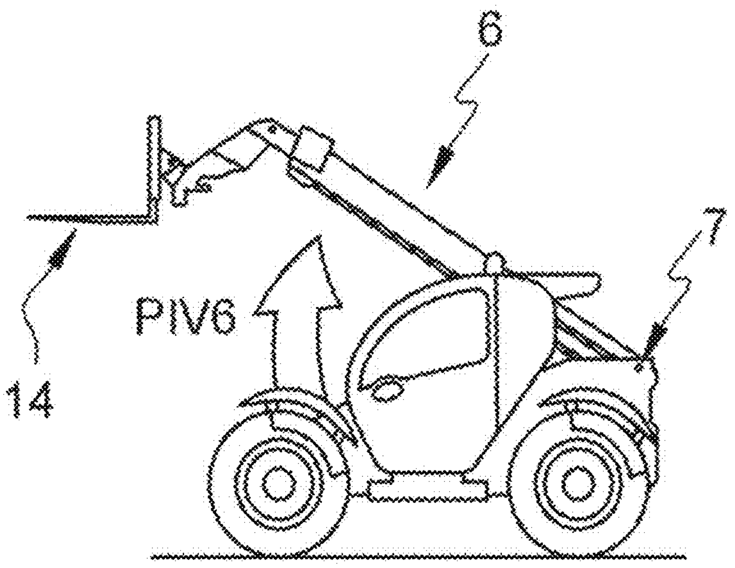
FIG. 1 is a side view of a handling machine according to one embodiment of the disclosure, while the lifting arm is being made to lift.
Figure 1A:
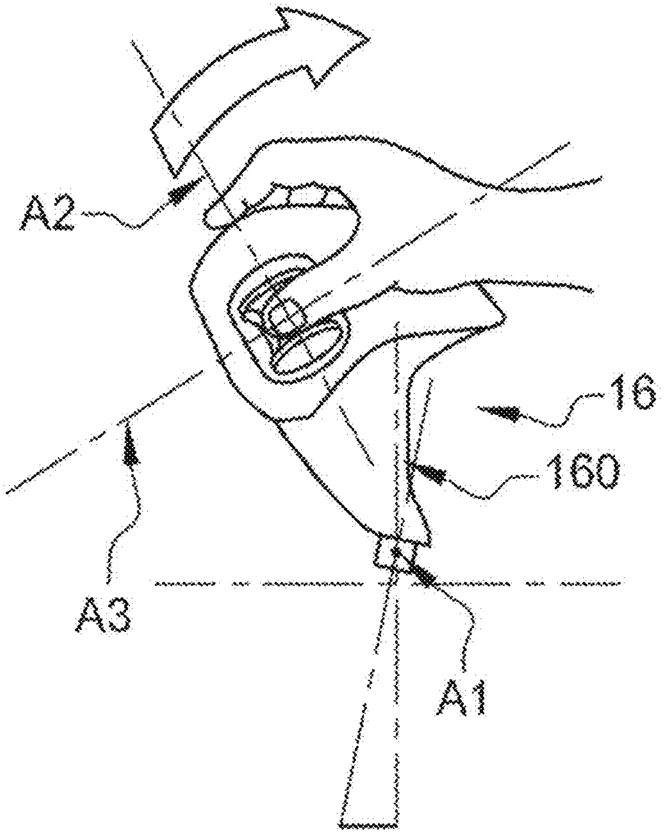
FIG. 1A is a side view illustrating the pivoting of the body of the control joystick toward the operator (which is to say toward the rear of the machine) to control the lifting of the arm illustrated in FIG. 1.

The concept of the disclosure is described more comprehensively below with reference to the appended drawings, which show embodiments of the concept of the disclosure. In the drawings, the size and relative sizes of the elements may be exaggerated for clarity purposes. Similar numbers refer to similar elements in all the drawings. However, this concept of the disclosure can be implemented in numerous different forms and should not be interpreted as being limited to the embodiments set out here. Rather, these embodiments are proposed in order that this description be comprehensive, and communicate the scope of the concept of the disclosure to those skilled in the art.

A reference throughout the specification to "one/a embodiment" means that a particular functionality, structure, or feature that is described in relation to one embodiment is included in at least one embodiment of the present disclosure. As a result, where the expression "in one/a embodiment" appears at various locations throughout the specification, this does not necessarily refer to the same embodiment. In addition, the particular functionalities, structures or features may be combined in any suitable way in one or more embodiments.

As set out in detail below, what is thus proposed is a load handling machine of which the mobilities of the lifting arm and of the handling device mounted at the end of the lifting arm can be controlled using an ergonomic control device 16. The design of the control device 16 presented below makes it intuitive and natural to manipulate, and thus reduces the risks of handling errors by the operator.

With reference to the figures, what is shown is a load handling machine 1 which comprises a chassis 2 and a telescopic lifting arm 6 pivotably mounted on the chassis 2. It is also possible to provide that the arm 6 is carried by a rotary tower (not shown) mounted on the chassis. Specifically, the disclosure also applies to rotary telescopic handlers. In the example illustrated in FIG. 1, the chassis is a wheeled chassis.

A handling device 14 is articulated at one end of the lifting arm 6. The lifting arm 6 may be shifted between a position referred to as lowered position and a raised position.

An actuation system, preferably formed of rams, makes it possible to displace said lifting arm 6 in relation to the chassis 2 and to shift the handling device 14 in relation to the lifting arm 6.

The handling machine includes a processing unit 10, comprising for example a computer, which makes it possible to control the handling arm. In particular, the machine comprises a manual control device 16 which allows the operator, by operating said control device, to transmit control signals for the position of the arm 6 (lifting angle, length) and control signals for the handling device (inclination in relation to the arm) to the processing unit 10.

In the example illustrated in the figures, the telescopic lifting arm 6 comprises a first segment 61 and a second segment 62, which is mounted slidingly in relation to the first segment 61. According to other embodiments, the telescopic lifting arm 6 comprises a greater number of segments mounted slidingly in relation to one another.

The control device 16 makes it possible to perform a function of manipulating the arm, which is to say controlling the angular position of the arm 6 and the telescopic position of the arm 6 which corresponds to the extended position of the second segment 62 of the arm in relation to the first segment of the arm 61 as set out in detail below.

The control device 16 presented below makes it possible to provide a more natural correlation between the operator's movements and those of the machine.

Lifting Arm

Figure 5:
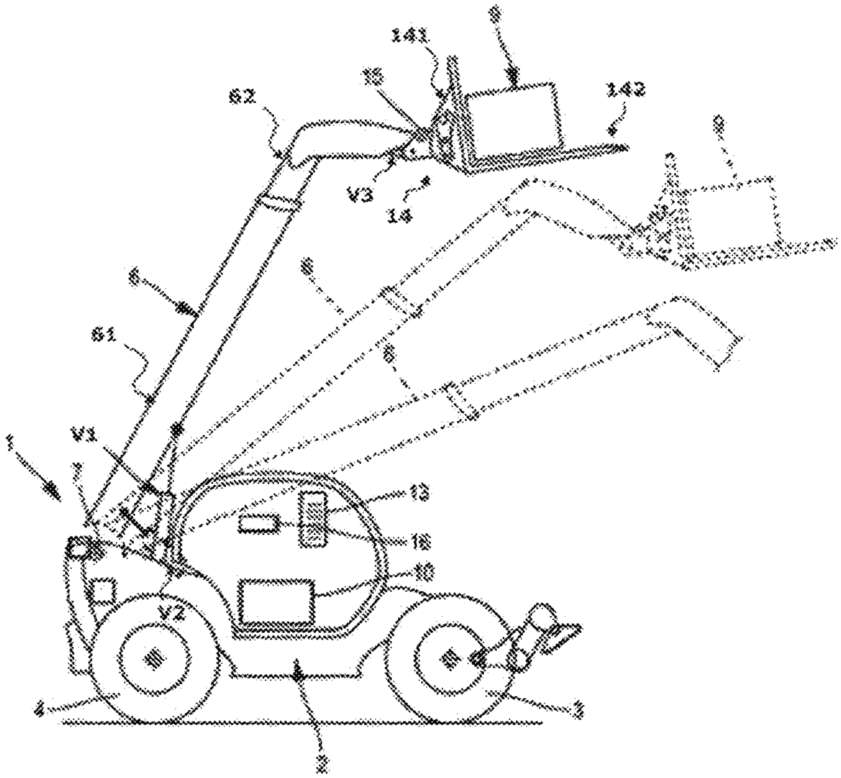
FIG. 5 is a side view of a handling machine according to one embodiment of the disclosure.

In the example illustrated in the figures and more particularly in FIG. 5, the lifting arm 6 (or handling arm) is mounted on the chassis 2 and can be oriented about an axis of rotation 7. According to one embodiment, the axis of rotation 7 is parallel to the plane in which the wheels of the machine rest on the ground such that, when the wheels of the machine rest on a horizontal ground, the axis of rotation 7 is horizontal. The arm 6 projects to the front of the machine.

According to one embodiment, the lifting arm 6 is articulated to the chassis 2 in an area closer to the rear axle (which is to say the shaft connecting the two rear wheels 4) than to the front axle (which is to say the shaft connecting the two front wheels 3). In the case of a machine with a tower, it is similarly possible to provide that the lifting arm 6 is articulated to the tower in an area closer to the rear axle than to the front axle when the arm is oriented toward the front of the machine.

In other words, the arm 6 is configured to pivot about an axis transverse to the longitudinal axis of the machine so as to be displaced between a lowered position and a raised position. The arm makes it possible to reach different angles of inclination in relation to the plane in which the wheels of the machine rest on the ground, and notably to reach, in the high position, a maximum angle, for example ranging between 55° and 70°, in relation to the plane in which the wheels of the machine rest on the ground. The minimum angle that can be reached by the arm in the low position in relation to the plane in which the wheels of the machine rest on the ground ranges, for example, between −5° and 5°. According to one embodiment, the arm has an angular travel of at least 50°.

Handling Device

According to one embodiment, the handling device 14 comprises a tool holder 141, also referred to as carriage, and a handling tool 142 dismountably fixed to the tool holder. The tool holder 141 may receive various types of handling tools. In a variant, the handling tool may be integrated in the carriage 141, without the option of dismounting the tool from the carriage.

The tool holder 141 is mounted articulatedly in relation to the lifting arm 6. The handling device is articulated to the arm 6 via an articulation shaft 15, which is parallel to the axis 7 and configured to be able to perform various operations depending on the handling tool coupled to the carriage.

Thus, in the example illustrated in FIG. 1, the handling tool comprises forks for manipulating a load 9, such as a pallet, but the forks can be replaced by a bucket or another tool.

As recalled above, the arm 6 is of the telescopic type. The arm 6 thus comprises at least a first segment 61 and a second segment 62 which can be deployed by a deployment ram, not shown, which is arranged between the two segments. The arm may comprise more than two segments.

In the example of FIG. 1, the actuation device of the handling device in particular includes a lifting ram V1 which makes it possible to shift the arm 6 upward and downward about the axis 7, under the supervision of the processing unit 10. The lifting arm 6 forms an angle with a reference position, such as the horizontal (or the plane in which the machine rests on the ground).

According to one embodiment, the actuation device of the handling device also comprises an inclination ram V3 which makes it possible to pivot the carriage 141 in relation to the lifting arm 6, under the supervision of the processing unit 10. It is also possible to provide that the actuation device of the handling device comprises a rotation ram situated at the side of the tool to make it possible to turn the tool in relation to the carriage.

It is also possible to provide that the actuation device of the handling device 14 comprises a compensation ram V2 which is coupled to the chassis 2 and to the lifting arm 6 and in fluidic communication with the inclination ram V3 such that the inclination ram V3 is slaved to the compensation ram to substantially maintain the orientation of the carriage 141 (and thus of the tool) when the lifting arm 6 is shifted. The inclination ram V3 otherwise remains controllable by the operator using a control member 17 presented below to control the inclination of the carriage 141 in relation to the arm 6 in order to carry out operations with the handling tool 142 coupled to the carriage. Other compensation means, for example of the electronic type, can be envisaged.

In the example illustrated in the figures, the rams are hydraulic rams. In a variant, the rams may be of the electric type.

Control

The handling machine comprises a man-machine interface which makes it possible to control the handling machine.

The man-machine interface comprises the control device 16. The control device comprises a base which is fixed in relation to the chassis 2, and a control body 160 which is mobile in relation to this fixed base and makes it possible to control the lifting arm 6 and the handling device 14. In the example illustrated in the figures, the control device 16 is accommodated in the cab of the handling machine.

The control device 16 is connected to the processing unit 10 which can thus control all or some of the rams, for example via a hydraulic circuit (not shown), depending on how the operator operates the control body 160.

When the machine is provided with a hydraulic circuit, the hydraulic circuit may comprise a hydraulic pressure source and a hydraulic distributor interposed between the hydraulic pressure source and a control solenoid valve for each actuator formed by a hydraulic ram. The control solenoid valve can be controlled by the processing unit 10 depending on how the operator operates the control device 16. In a variant, and as recalled above, it is possible to provide that the rams are electric rams.

The man-machine interface may also comprise a screen 13 which makes it possible for example to provide the operator with feedback on the actions they perform.

When the machine is a motorized wheeled machine, the man-machine interface also usually comprises a system for controlling movement on the ground, such as a set of pedals, enabling acceleration and braking, and a steering wheel for steering the machine.

Control Device

As recalled above, the control device 16 comprises a main control body 160, such as the body of a joystick, which can be operated with an operator's hand to generate a control signal for pivoting the lifting arm 6, by pivoting the control device 16 toward the front or toward the rear of the machine about a first pivot axis A1 to generate a control signal for pivoting PIV6 the lifting arm 6 (see FIG. 1).

The control device 16 also comprises a control member 17, such as a rotary selector, carried by the control body 160, on a lateral side of the control body 160. The control member 17 is preferably situated on a side of the body 160 of the joystick corresponding to an area where the thumb of the operator's hand is positioned.

Figure 2:
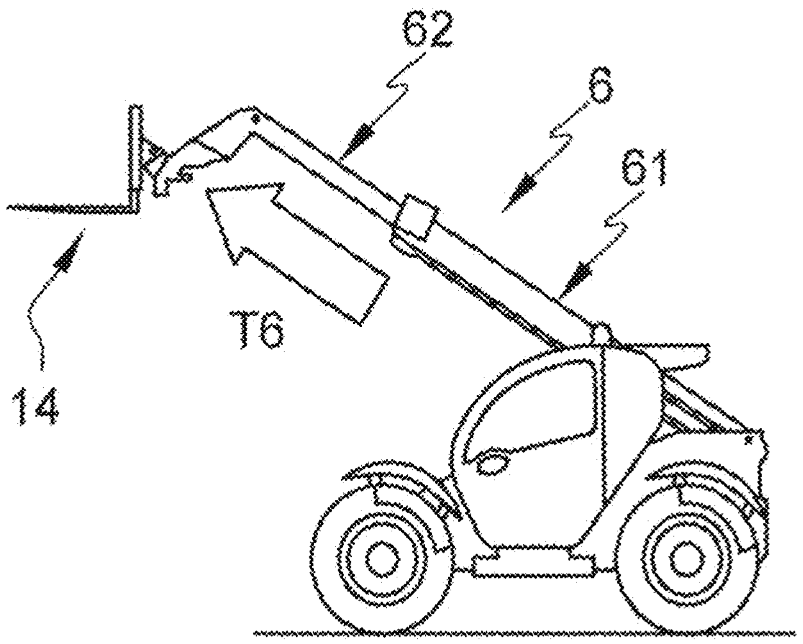
FIG. 2 is a side view of a handling machine according to one embodiment of the disclosure, while the telescopic lifting arm is being made to extend.
Figure 2A:
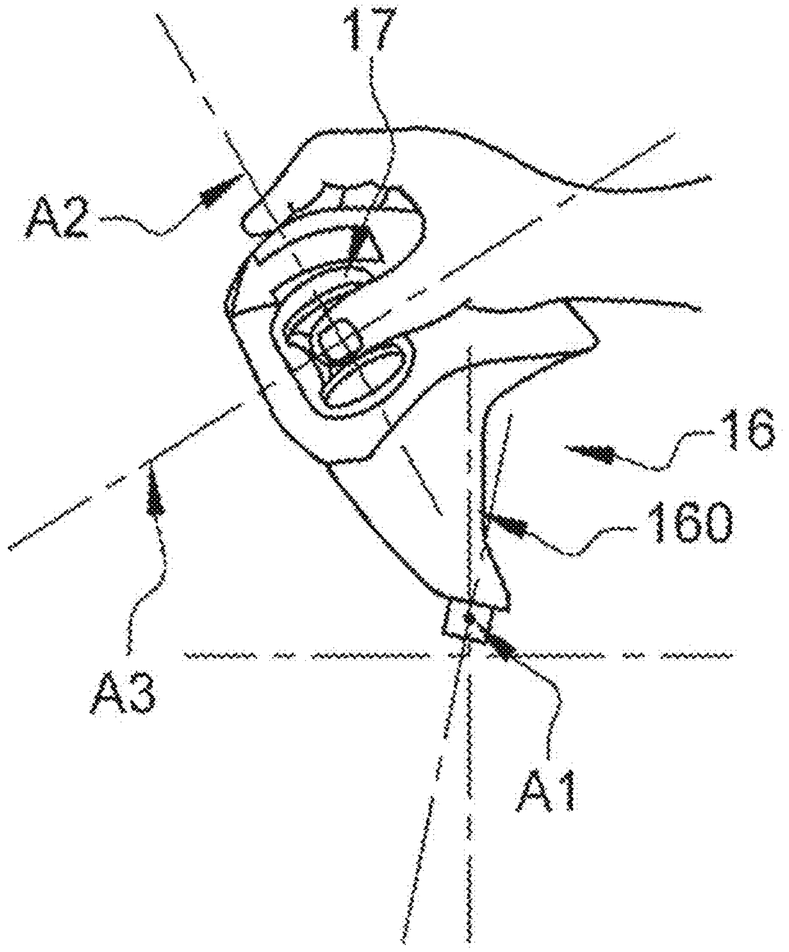
FIG. 2A is a side view illustrating the pivoting of the lateral rotary selector of the body of the control joystick, about a first pivot axis of a rotary selector, forward (and downward) to control the deployment of the arm illustrated in FIG. 2.
Figure 4:
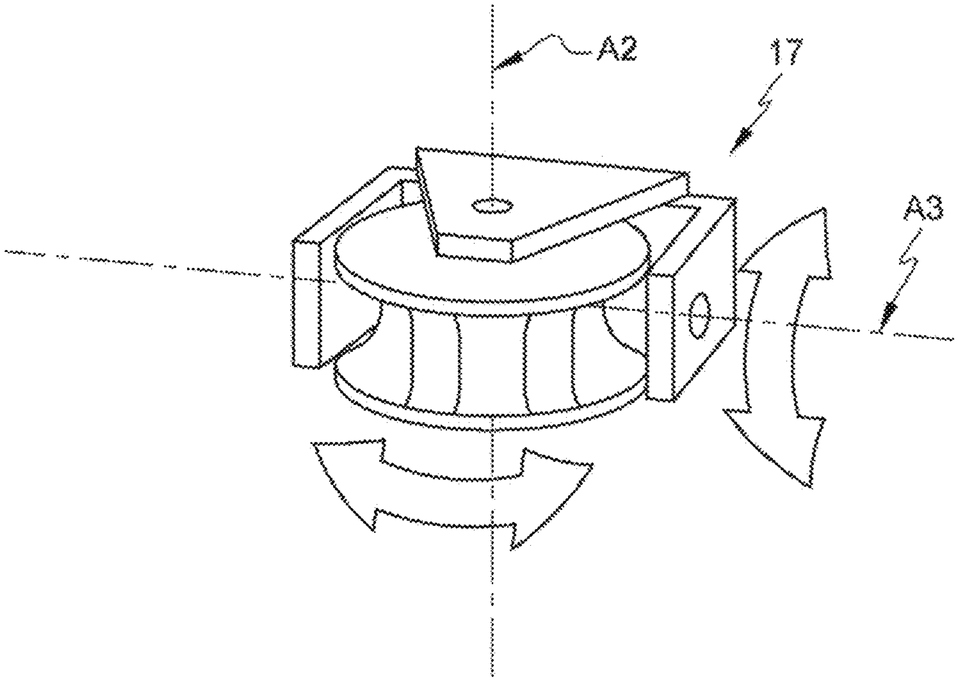
FIG. 4 is a perspective view illustrating the mutually orthogonal first pivot axis and second pivot axis of the lateral rotary selector of the body of the control joystick of the handling machine according to one embodiment of the disclosure.

According to one embodiment and as illustrated in FIG. 4, the control member 17 is mounted pivotably in relation to the main body 160 about a second pivot axis A2 which can be operated with the thumb of the operator's hand to generate a control signal for sliding T6 the second segment of the lifting arm (see FIG. 2).

Figure 4A:
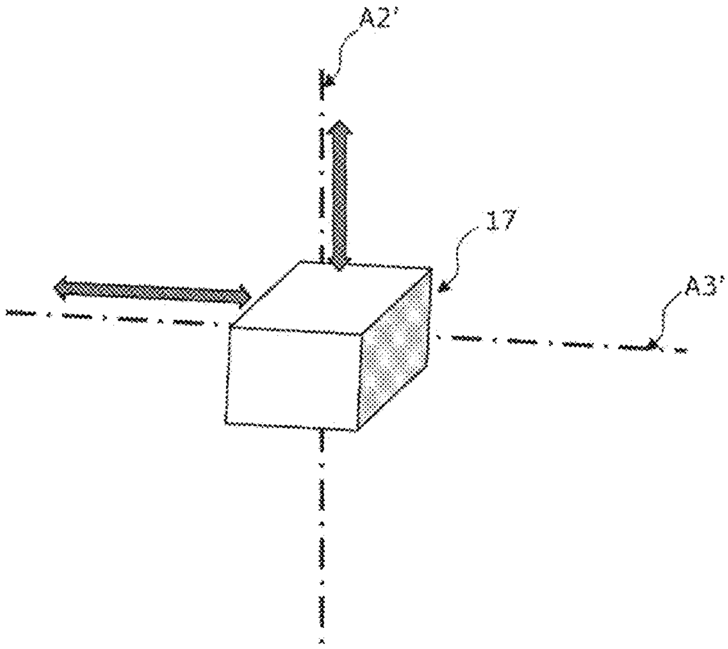
FIG. 4A is a perspective view illustrating a rectilinear sliding axis (in translational movement) and a rectilinear sliding axis (in translational movement) of a lateral slider of the body of a control joystick, the axes being orthogonal to one another, for a handling machine according to an embodiment variant of the disclosure.

According to an embodiment variant illustrated in FIG. 4A, the control member 17 may take the form of a slider, by being mounted slidingly (in rectilinear translational movement) in relation to the main body 160 along a second axis A2' to generate a control signal for sliding T6 the second segment of the lifting arm. The second axis A2' may correspond to the axis A2 presented above.

Figure 3:
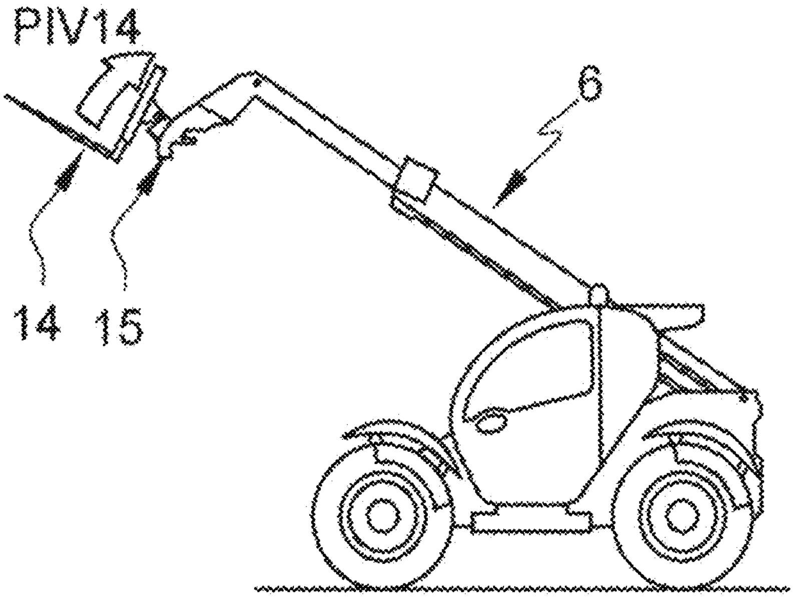
FIG. 3 is a side view of a handling machine according to one embodiment of the disclosure, while the handling device is being made to pick up.
Figure 3A:
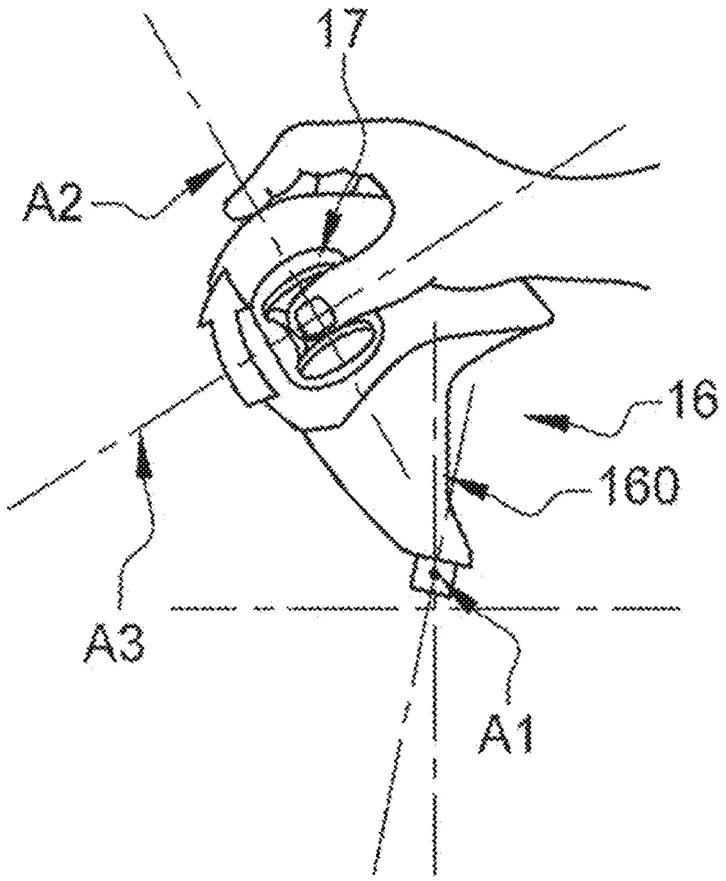
FIG. 3A is a side view illustrating the pivoting of the lateral rotary selector of the body of the control joystick, about a second pivot axis of a rotary selector, upward (and forward) to control the pickup by the handling device illustrated in FIG. 3.

As illustrated in FIG. 4, the control member 17 is also mounted pivotably about a third axis A3, transverse to the second pivot axis A2, to control the pivoting PIV14 of the handling device 14 in relation to the lifting arm 6 between the discharge position and the pick-up position (see FIG. 3).

According to an embodiment variant illustrated in FIG. 4A, the control member 17 is also mounted slidingly (in rectilinear translational movement) along a third axis A3', transverse to the second axis A2', to control the pivoting PIV14 of the handling device 14 in relation to the lifting arm 6. The third axis A3' may correspond to the axis A3 presented above.

It goes without saying that the control member 17 can be operated simultaneously along its two mobility axes to control the retraction or extension of the arm 6 and the pivoting PIV14 of the handling device 14 in relation to the arm 6 in combination.

According to a particular embodiment which is not illustrated, it is possible to provide that the control member 17 is mounted pivotably about an axis in relation to the main body 160 to control one of the pivoting mobility of the handling device and the telescopic mobility of the arm, and that the control member is mounted slidingly along another axis, preferably orthogonal to the preceding axis, to control the other mobility.

According to a particular design and as illustrated more particularly in FIG. 3, it is possible to provide that, in the non-operated state of the main body 160 of the control device 16, the third pivot axis A3 (or, in a variant, the sliding axis A3') has, with reference to a shift along said third pivot axis A3 (or A3', respectively) from a point situated toward the rear of the machine to a point situated toward the front of the machine, a downwardly oriented inclination in relation to the horizontal.

It is also possible to provide that, in the non-operated state of the main body 160 of the control device 16, the second pivot axis A2 (or, in a variant, the sliding axis A2') has, with reference to a shift along said second pivot axis A2 (or A2', respectively) from a point situated toward the rear of the machine to a point situated toward the front of the machine, an upwardly oriented inclination in relation to the horizontal.

According to a preferred embodiment of the disclosure, the main body 160 of the control device 16 comprises a single pivot axis which is formed by the first pivot axis A1. In a variant, although it is less advantageous in terms of bulk, it is possible to provide that the main body can have one or more other mobilities for assigning it one or more other control functions.

According to a preferred embodiment, the control device 16 acts electro-proportionally to make it possible, when the operator shifts the control body 160 and/or the control member 17 into a given position, to transmit a signal which is a function of the position of the control body 160 and/or of the control member 17, and to thus be able to precisely control the arm and/or the handling device.

In particular, the processing unit 10 is configured such that the higher the magnitude of the shifting travel of the control body 160 or of the control member 17 imposed by the operator is, the faster the corresponding arm 6 or handling device 14 is made to shift.

The control body 160 is distinguished in particular from the levers, or joystick, which are known from the prior art owing to the control body 160 being provided with a control member 17 on a lateral side of the control body which has two axes A2, A3 (or, in a variant, two axes A2', A3') of different mobilities as illustrated in FIG. 4 and explained above, one of the mobilities serving to control the telescopic movement and the other mobility serving to control the inclination of the handling device for the pickup or discharge operation, and said controls can be combined.

Processing Unit

The machine comprises a processing unit, as mentioned above. The processing unit is for example a computer. The processing unit used to control the actuation system of the lifting arm and of the handling device may be fully or partially shared with the processing unit that makes it possible to control the movement of the machine on the ground.

The processing unit takes the form, for example, of a processor and a data memory in which computer instructions executable by said processor are stored, or the form of a microcontroller.

The functions and steps described may be implemented in the form of a computer program or using hardware components (for example programmable gate arrays). In particular, the functions and steps performed by the processing unit or its modules may be performed by sets of instructions or computer modules implemented in a processor or controller or may be performed by dedicated electronic components or components of the programmable logic circuit (or FPGA, which stands for field-programmable gate array) type or of the application-specific integrated circuit (ASIC) type. It is also possible to combine computer portions and electronic portions.

When it is specified that the unit or means or modules of said unit are configured to perform a given operation, it means that the unit comprises computer instructions and the corresponding means of execution to allow said operation to be performed and/or that the unit comprises corresponding electronic components.

The processing unit is thus an electronic and/or computer unit. When it is specified that said unit is configured to perform a given operation, it means that the unit comprises computer instructions and the corresponding means of execution to allow said operation to be performed and/or that the unit comprises corresponding electronic components.

The handling machine preferably comprises a sensor system connected to the processing unit. The sensor system comprises a lifting arm angle sensor, and preferably a sensor for detecting the telescopic position of the arm, which is to say the position of the second segment 62 of the arm 6 in relation to the first segment 61.

The design of the new control device (manual joystick) allows the operator to act manually on the control device naturally and intuitively, in particular by making it possible to pivot the control member, preferably formed by a rotary selector or a slider, about a pivot axis or along a slideway downward and forward to extend the arm and in reverse, upwards and rearwards, to retract the arm, and by making it possible to pivot the rotary selector or slide the slider about another pivot axis or along another slideway upward and forward for pickup and in reverse, downwards and rearwards, for discharge, while still retaining, as in the prior art, the option of pulling the mobile control body of the control device toward them to increase the angle of the lifting arm and to push the mobile control body away to reduce the angle of the lifting arm.

The disclosure is not limited to the embodiments illustrated in the drawings.

In addition, the term "comprising" does not rule out further elements or steps. Moreover, features or steps which have been described with reference to one of the embodiments set out above can also be used in combination with further features or steps of other embodiments set out above.

The invention claimed is:

1. A handling machine comprising:

a chassis;

a telescopic lifting arm carried by the chassis, the telescopic lifting arm including first and second arm segments that can be shifted slidingly in relation to one another, the telescopic lifting arm being mounted pivotably in relation to the chassis between a low position and a high position;

a handling device mounted at one end of the telescopic lifting arm, the handling device being pivotable in relation to the telescopic lifting arm between a discharge position and a pick-up position;

a processing unit configured to control pivoting of the telescopic lifting arm, sliding of the second arm segment, and pivoting of the handling device; and a control device including:

a control body that can be operated with an operator's hand to generate a control signal for pivoting the telescopic lifting arm by pivoting the control body toward a front or toward a rear of the handling machine about a first pivot axis, and a control member that can be operated with a thumb of the operator's hand, the control member being one of a rotary selector or a slider, the control member being carried by the control body on a lateral side of the control body corresponding to an area where the thumb of the operator's hand is positioned and being mounted one of pivotably or slidingly in relation to the control body about or along one of a second pivot axis or a first sliding axis to generate a control signal for sliding the second arm segment of the telescopic lifting arm, wherein the control member is also mounted one of pivotably or slidingly in relation to the control body about or along one of a third pivot axis or a second sliding axis transverse to one of the second pivot axis or the first sliding axis to control the pivoting of the handling device in relation to the telescopic lifting arm between the discharge position and the pick-up position.

2. The handling machine of claim 1, wherein the control body of the control device comprises only a single pivot axis which is formed by the first pivot axis.

3. The handling machine of claim 2, wherein the control body of the control device does not have any lateral pivoting mobility.

4. The handling machine of claim 1 wherein, in a non-operated state of the control body of the control device, one of the third pivot axis or the second sliding axis of the control member has, with reference to a shift from a point situated toward the rear of the handling machine to a point situated toward the front of the machine, a downwardly oriented inclination in relation to the horizontal.

5. The handling machine of claim 1, wherein, in a non-operated state of the control body of the control device, one of the second pivot axis or the first sliding axis of the control member has, with reference to a shift from a point toward the rear of the handling machine to a point toward the front of the handling machine, an upwardly oriented inclination in relation to the horizontal.

6. The handling machine of claim 1, wherein one of the second pivot axis or the first sliding axis and one of the third pivot axis or the second sliding axis are orthogonal.

7. A handling machine comprising:

a chassis;

a telescopic lifting arm pivotably mounted to the chassis, the telescopic lifting arm being pivotable between a low position and a high position and including first and second arm segments that are slidingly shiftable relative to one another;

a handling device pivotably mounted to an end of the telescopic lifting arm, the handling device being pivotable between a discharge position and a pick-up position;

a processing unit configured to control pivoting of the telescopic lifting arm, sliding of the second arm segment, and pivoting of the handling device; and a control device including:

a control body operable via an operator's hand to generate a control signal for pivoting the telescopic lifting arm by pivoting the control body toward a front or toward a rear of the handling machine about a first pivot axis, and a control member operable via a thumb of the operator's hand, the control member being moveably mounted to a lateral side of the control body corresponding to an area where the thumb of the operator's hand is positioned via one or more of a second pivot axis and a first sliding axis, to generate a control signal for sliding the second arm segment, wherein the control member is further moveably mounted to the control body via one or more of a third pivot axis and a second sliding axis transverse to one or more of the second pivot axis and the first sliding axis, to control the pivoting of the handling device in relation to the telescopic lifting arm between the discharge position and the pick-up position.

8. The handling machine of claim 7, wherein the control body of the control device includes a single pivot axis formed by the first pivot axis.

9. The handling machine of claim 8, wherein the control body of the control device is laterally immobilized.

10. The handling machine of claim 7, wherein, in a non-operated state of the control body, one or more of the third pivot axis and the second sliding axis have a downwardly oriented inclination toward the front of the handling machine in relation to the horizontal.

11. The handling machine of claim 7, wherein, in a non-operated state of a main body of the control device, one or more of the second pivot axis and the first sliding axis have an upwardly oriented inclination toward the front of the handling machine in relation to the horizontal.

12. The handling machine of claim 7, wherein one or more of the second pivot axis and the first sliding axis is orthogonal to one or more of the third pivot axis and the second sliding axis.

13. A handling machine comprising:

a lifting arm mounted to a chassis, the lifting arm being pivotable between a low position and a high position and including a first arm segment slidable relative to a second arm segment;

a handling device mounted to the lifting arm, the handling device being pivotable between a discharge position and a pick-up position;

a processing unit configured to control movement of the lifting arm, the second arm segment, and the handling device; and a control device including:

a control body pivotable about a first pivot axis to generate a pivot control signal for the lifting arm, and a control member moveably mounted to the control body about one or more of a second pivot axis, a third pivot axis, a first sliding axis, and a second sliding axis to generate a sliding control signal for the second arm segment, wherein one or more of the third pivot axis and the second sliding axis are transverse to one or more of the second pivot axis and the first sliding axis, and wherein the control member is situated on a lateral portion of the control body corresponding to an operator's thumb.

14. The handling machine of claim 13, wherein the control body is provided in the form of a joystick.

15. The handling machine of claim 13, wherein the control member is one of a rotary selector or a slider.

16. The handling machine of claim 13, wherein one or more of the third pivot axis and the second sliding axis are downwardly oriented toward a front of the handling machine.

17. The handling machine of claim 13, wherein one or more of the second pivot axis and the first sliding axis are upwardly oriented toward a front of the handling machine.

* * * * *